US008976423B2

(12) United States Patent
Chen et al.

(10) Patent No.: US 8,976,423 B2
(45) Date of Patent: Mar. 10, 2015

(54) OPTICAL SCANNING SYSTEM AND IMAGING APPARATUS FOR USING SAME

(71) Applicant: Lexmark International, Inc., Lexington, KY (US)

(72) Inventors: Fei Chen, Lexington, KY (US); Brent Steven Dupree, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 13/875,756

(22) Filed: May 2, 2013

(65) Prior Publication Data
US 2014/0268252 A1 Sep. 18, 2014

Related U.S. Application Data

(60) Provisional application No. 61/801,927, filed on Mar. 15, 2013.

(51) Int. Cl.
*H04N 1/04* (2006.01)
*H04N 1/028* (2006.01)

(52) U.S. Cl.
CPC .................. *H04N 1/0281* (2013.01)
USPC ........ 358/474; 358/475; 358/409; 359/213.1; 359/633

(58) Field of Classification Search
CPC ................. G02B 2027/0178; G02B 27/017; G02B 27/0172; G02B 6/0018; G02B 6/0028; G02B 2027/0123
USPC ........... 359/213.1, 199, 630, 633, 850, 204.1, 359/290, 387, 391, 853, 858, 869; 358/474, 358/475, 409, 501
See application file for complete search history.

(56) References Cited

U.S. PATENT DOCUMENTS

| | | | | |
|---|---|---|---|---|
| 4,279,472 A * | 7/1981 | Street | ........................ | 250/201.1 |
| 5,581,605 A * | 12/1996 | Murakami et al. | ............... | 378/84 |
| 5,929,979 A * | 7/1999 | Okino et al. | ..................... | 355/60 |
| 6,141,118 A * | 10/2000 | Yamawaki et al. | ........... | 358/481 |
| 6,147,776 A * | 11/2000 | Sakurai et al. | ................ | 358/471 |
| 6,665,051 B2 * | 12/2003 | Komatsuda | ..................... | 355/67 |
| 6,844,951 B2 * | 1/2005 | Cannon et al. | ............. | 359/199.3 |
| 6,919,977 B2 * | 7/2005 | Cannon et al. | ............. | 359/199.1 |
| 6,970,275 B2 * | 11/2005 | Cannon et al. | ............. | 359/213.1 |
| 7,055,957 B2 * | 6/2006 | Troyer | ............................ | 353/31 |
| 7,209,268 B2 * | 4/2007 | Ikeda | ............................ | 358/475 |
| 7,697,750 B2 * | 4/2010 | Simmons | ...................... | 382/154 |
| 7,741,557 B2 * | 6/2010 | Cobb et al. | ..................... | 136/246 |
| 7,760,612 B2 * | 7/2010 | Komma et al. | .......... | 369/112.16 |
| 7,956,730 B2 * | 6/2011 | White et al. | ................ | 340/426.2 |
| 8,054,467 B2 * | 11/2011 | Den Boef et al. | ............. | 356/456 |
| 8,063,927 B2 * | 11/2011 | Kato | ............................ | 347/236 |
| 8,111,434 B2 * | 2/2012 | Huang et al. | ................... | 358/474 |
| 2011/0135353 A1 | 6/2011 | Creteau et al. | | |

* cited by examiner

*Primary Examiner* — Negussie Worku

(57) ABSTRACT

A scanning system includes a scanning member having at least one reflective surface and at least one light source for emitting at least one light beam to be incident on the at least one reflective surface of the scanning member during a scanning operation. At least one curved synchronization mirror deflects and focuses at least a portion of the at least one light beam that is deflected by the scanning member to indicate at least one of a start and an end of a scan line operation of the scanning operation. A sensor receives the at least one light beam deflected and focused by the at least one curved synchronization mirror.

22 Claims, 4 Drawing Sheets

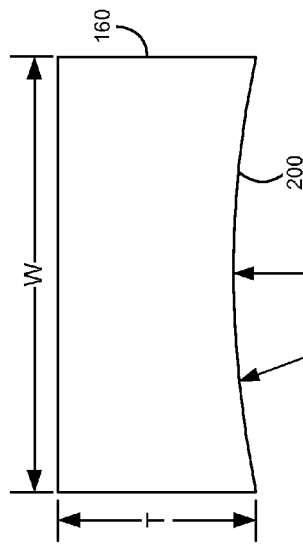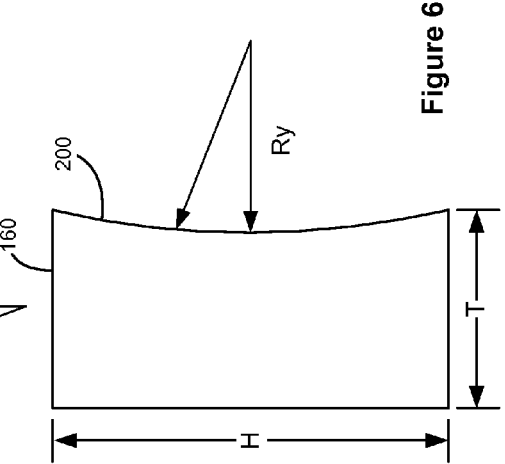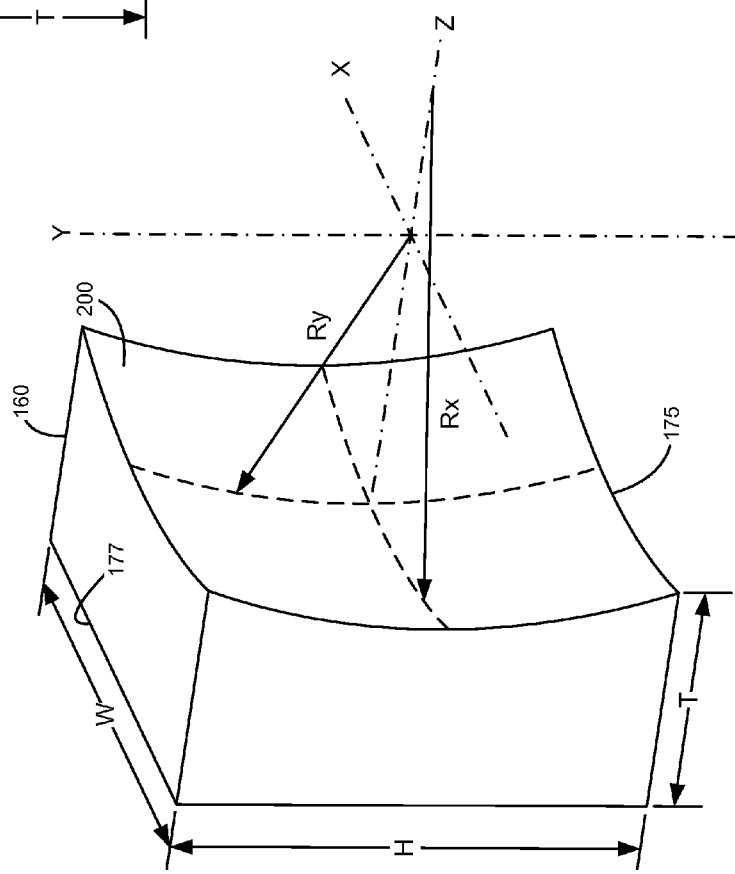

OPTICAL SCANNING SYSTEM AND IMAGING APPARATUS FOR USING SAME

CROSS REFERENCES TO RELATED APPLICATIONS

The present application is related to and claims priority under 35 U.S.C. 119(e) from U.S. provisional application 61/801,927, filed Mar. 15, 2013, entitled, "Plastic Curved Hsync Mirror in Laser Scanning Unit," the content of which is hereby incorporated by reference herein it is entirety.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure relates generally to an optical scanning system in an imaging apparatus, and particularly to synchronization optics used in a scanning unit.

2. Description of the Related Art

In various imaging devices which utilize light to form images, optical scanning systems are typically incorporated to scan light beams from one or more light sources onto a target image plane surface. In an electrophotographic imaging device, for example, the image plane surface is typically a photosensitive member. Generally, light beams are swept across the image plane surface by a scanning mirror to form light spots upon the image plane surface along a scan line direction. The scanning mirror may be a rotating polygon mirror which scans light beams in one direction, or an oscillating mirror which scans light beams bidirectionally in both forward and reverse directions. Multiple scan lines are formed as light beams are scanned in a process/sub-scan direction, such as when the image plane surface moves orthogonally relative to the scan line direction while the scanning mirror is scanning the light beams in the scan line direction.

In order to achieve accurate writing of image information on the image plane surface, it is known to synchronize the formation of the scan lines on the target image plane surface. Typically, synchronization is achieved by optically detecting light beams with one or more photodetectors at the start of each scan line operation. Light beams detected by the photodector create pulses that are used to synchronize the start of scan for each successive scan line such that the scan lines start at a common reference. In some scanning systems, the photodetector is disposed downstream of the scanning mirror to directly intercept a light beam scanned proximate a boundary that the scanning mirror can scan the light beam. For bidirectional scanners, another photodetector may be disposed to directly intercept the light beam when scanned near an opposite scanning boundary. In other existing designs, mirrors are disposed to intercept a light beam when scanned near the scan boundaries, and to direct the intercepted light beam towards a photodetector.

In order to focus light beams on the photodetector, some existing approaches have taken advantage of the focusing function of scan lenses which are used to focus light beams onto the image plane surface. For example, as shown in FIG. 1 illustrating an example scanning unit 10, a sensor 15 for sensing a light beam 20 when scanned by a scanning mirror 25 at opposite scan boundaries represented as virtual extensions 30A, 30B of light beam 20, is disposed downstream of a scan lens 35, relative to optical paths of the light beam 20. In this way, light beam 20 first passes through scan lens 35 and is focused thereby before reaching sensor 15. However, in order to focus light beam 20 on sensor 15, the optical path length of light beam 20 from scanning mirror 25 to sensor 15 is substantially matched with the optical path length of light beam 20 from scanning mirror 25 to the image plane surface 37. Because of the optical length constraints, mirrors 40A, 40B, and 40C are typically emplaced within the housing of the scanning unit 10 and downstream scan lens 35 to intercept and direct light beam 20 toward sensor 15. In particular, mirrors 40A and 40C pick off light beam 20 at the scan boundaries 30A and 30B, respectively, after light beam 20 passes through scan lens 35. The light beam 20 picked off by mirror 40C is directly reflected towards sensor 15 while the light beam 20 picked off by mirror 40A is directed to and reflected by mirror 40B before reaching sensor 15. This, however, increases the overall size of the housing of the scanning unit 10.

Moreover, some existing designs also incorporate additional focusing lenses placed in the optical path of a light beam deflected toward the photodetector. For example, in FIG. 1, a synchronization lens 45 is disposed in front of sensor 15 to focus light beams directed by mirrors 40 toward sensor 15. Generally, such synchronization lenses are cylindrical. In addition, since adding optical power along the scan line direction may significantly reduce laser spot velocity and increase scan jitter, these cylindrical lenses typically have optical power only along the process direction.

In the above example designs, the size and number of synchronization optical components, the complex beam paths, and constraints on optical path length, all serve to increase the size of the housing of the scanning unit and, consequently, increase the overall cost of the housing of the scanning unit.

Accordingly, there is a need for a scanning unit implementing a simplified synchronization optics design to improve compactness and cost of the scanning unit.

SUMMARY

Example embodiments of the present disclosure provide a scanning system incorporating a synchronization optics design which allows for a more compact and cost efficient scanning unit.

In an example embodiment, a scanning system includes a scanning member having at least one reflective surface, and at least one light source for emitting at least one light beam to be incident on the at least one reflective surface of the scanning member during a scanning operation. At least one curved synchronization mirror is disposed for deflecting and focusing at least a portion of the at least one light beam that is deflected by the scanning member to indicate at least one of a start and an end of a scan line operation of the scanning operation. A sensor is positioned downstream of the at least one curved synchronization mirror, relative to the optical path of the at least one light beam, for receiving the at least one light beam deflected and focused by the at least one curved synchronization mirror.

In one example embodiment, the at least one curved synchronization mirror is positioned between at least one scan lens and the scanning member. The at least one curved synchronization mirror includes a first curved synchronization mirror positioned proximate a first end portion of the at least one scan lens, and a second curved synchronization mirror positioned proximate a second end portion of the at least one scan lens. The first and second curved synchronization mirrors deflect and focus a first portion and a second portion of the at least one light beam to indicate the start and the end of the scan line operation, respectively, onto the sensor.

In another example embodiment, an imaging device includes at least one photoconductive member for being impinged with at least one light beam. A scanning unit generates the at least one light beam and repeatedly scans the at least one light beam across the at least one photoconductive member to form scan lines thereon. The scanning unit includes at least one light source for emitting the at least one light beam, and a scanning member having at least one reflective surface for receiving and deflecting the at least one light beam emitted by the at least one light source. At least one scan lens focuses onto the at least one photoconductive member portions of the at least one light beam containing image data and deflected by the scanning member. A synchronization mirror is disposed at a first position proximate an end portion of the at least one scan lens and between the at least one scan lens and the scanning member for receiving and deflecting at least a first portion of the at least one light beam deflected by the scanning member at the first position. A sensor is positioned to receive the at least one light beam deflected by the synchronization mirror. The scanning unit includes a housing having an opening, and the scan lens is disposed to cover the opening to prevent contaminants from entering the scanning unit.

BRIEF DESCRIPTION OF THE DRAWINGS

The above-mentioned and other features and advantages of the disclosed example embodiments, and the manner of attaining them, will become more apparent and will be better understood by reference to the following description of the disclosed example embodiments in conjunction with the accompanying drawings, wherein:

FIG. 4 illustrates a perspective view of a curved synchronization mirror used in the laser scanning unit of FIG. 3 according to an example embodiment;

FIG. 5 illustrates a top view of the curved synchronization mirror in FIG. 4; and FIG. 6 illustrates a side view of the curved synchronization mirror in FIG. 4.

DETAILED DESCRIPTION

Figure 1:
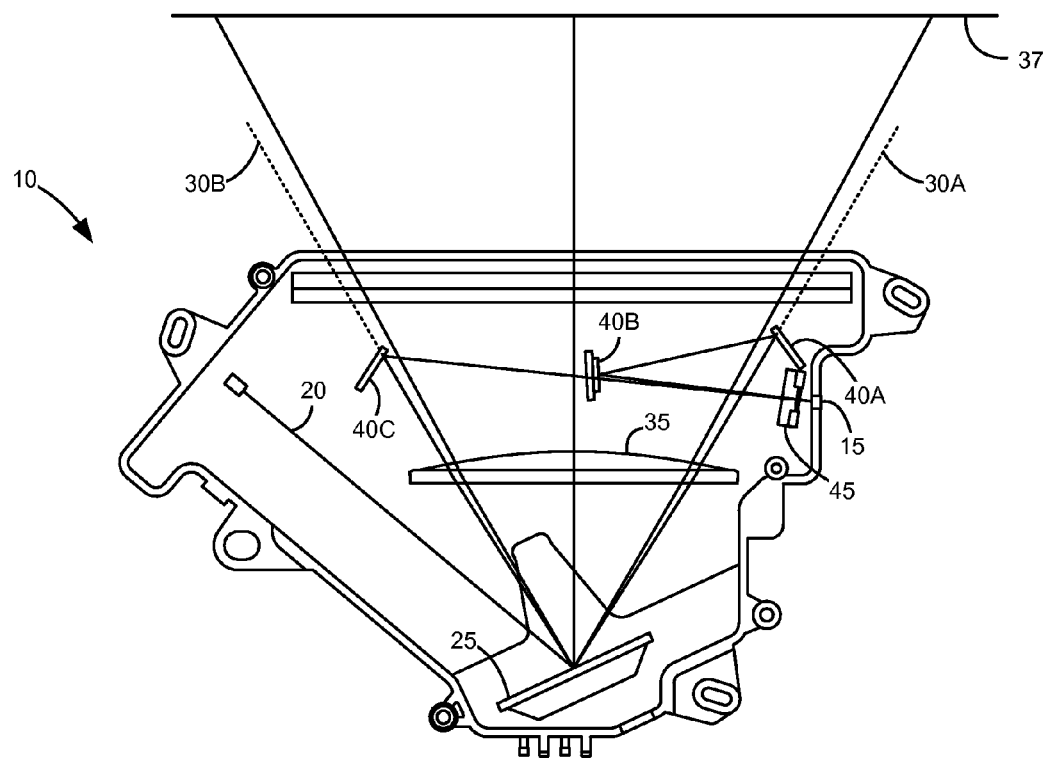
FIG. 1 illustrates a prior art schematic layout of a laser scanning unit.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Spatially relative terms such as "top", "bottom", "front", "back" and "side", and the like, are used for ease of description to explain the positioning of one element relative to a second element. Terms such as "first", "second", and the like, are used to describe various elements, regions, sections, etc. and are not intended to be limiting. Further, the terms "a" and "an" herein do not denote a limitation of quantity, but rather denote the presence of at least one of the referenced item.

Furthermore, and as described in subsequent paragraphs, the specific configurations illustrated in the drawings are intended to exemplify embodiments of the disclosure and that other alternative configurations are possible.

Reference will now be made in detail to the example embodiments, as illustrated in the accompanying drawings. Whenever possible, the same reference numerals will be used throughout the drawings to refer to the same or like parts.

Figure 2:
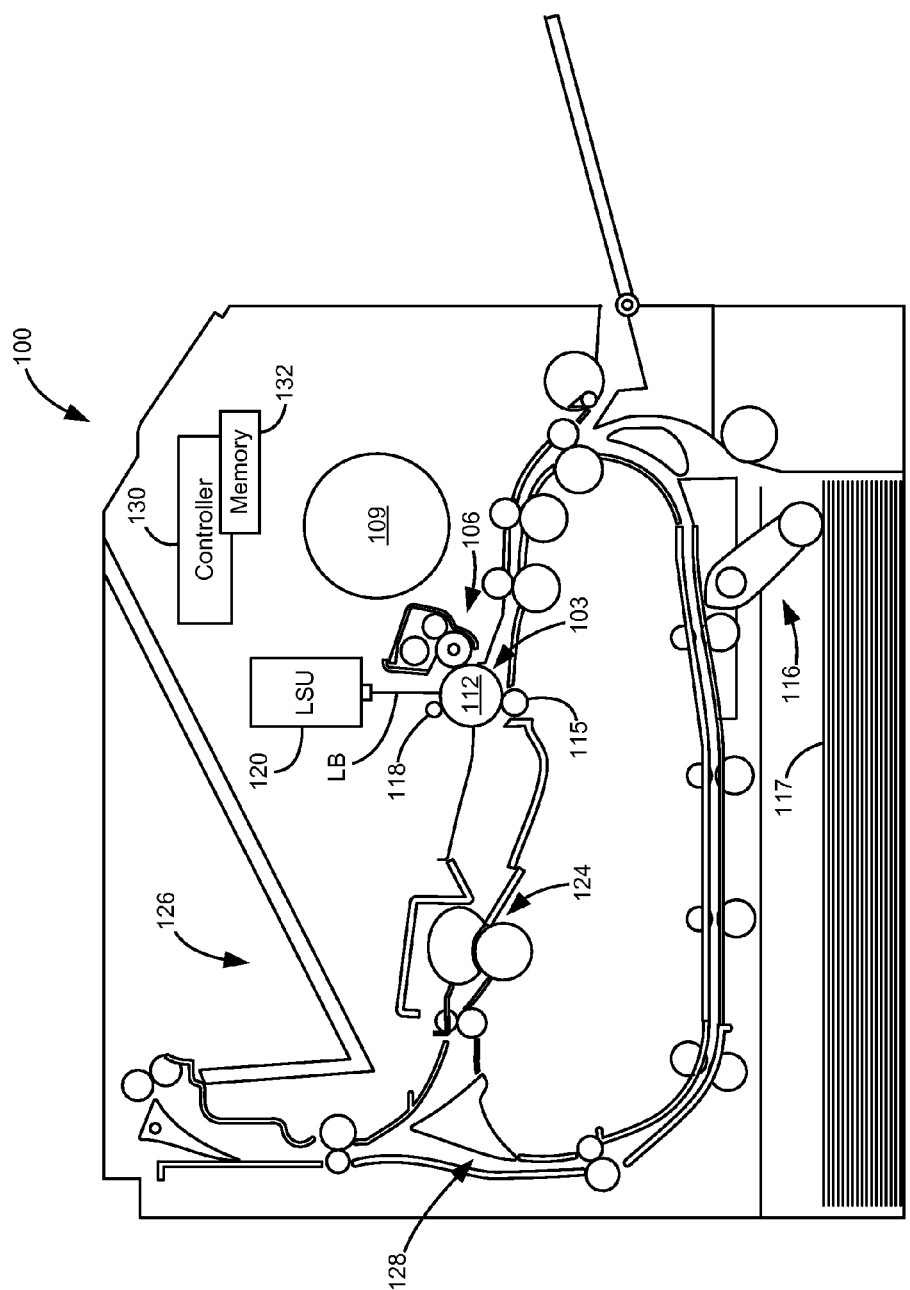
FIG. 2 is a side elevational view of an image forming apparatus according to an example embodiment.

FIG. 2 illustrates an image forming device 100 according to an example embodiment. Image forming device 100 may include a toner transfer area 103 having a developer unit 106 that is operably connected to a toner reservoir 109 for receiving toner for use in a printing operation. Toner reservoir 109 is controlled to supply toner as needed to developer unit 106. Developer unit 106 is associated with a photoconductive member 112 that receives toner therefrom during toner development to form a toned image thereon. Photoconductive member 112 is paired with a transfer member 115 for use in transferring toner to a sheet of print media that is picked by a pick assembly 116 from a media stack 117 and fed through toner transfer area 103 between photoconductive member 112 and transfer member 115.

During image formation, the surface of photoconductive member 112 is charged to a specified voltage, such as −800 volts, for example, by a charge roller 118. A laser beam LB from a laser scanning unit (LSU) 120 is directed to the surface of photoconductive member 112 and discharges those areas it contacts to form a latent image thereon. In one example embodiment, areas on the photoconductive member 112 illuminated and impinged by the laser beam LB are discharged to approximately −100 volts. The developer unit 106 then transfers toner to photoconductive member 112 to form a toner image thereon. The toner is attracted to the areas of the surface of photoconductive member 112 that are discharged by the laser beam LB from LSU 120. In one example embodiment, a positive voltage field formed in part by transfer member 115 attracts the toner image from photoconductive member 112 to the media sheet between the photoconductive member 112 to and transfer member 115.

A fuser assembly 124 is disposed downstream of toner transfer area 103 and receives media sheets with the unfused toner images superposed thereon. In general terms, fuser assembly 124 applies heat and pressure to the media sheets in order to fuse toner thereto. After leaving fuser assembly 124, a media sheet is either deposited into output media area 126 or enters duplex media path 128 for transport to toner transfer area 103 for imaging on a second surface of the media sheet.

Image forming device 100 is depicted in FIG. 2 as a monochrome laser printer which utilizes only a single developer unit 106 and photoconductive member 112 for depositing black toner to media sheets. In other alternative embodiments, image forming device 100 may be a color laser printer having four photoconductive members, each corresponding to an associated one of cyan, yellow, magenta, and black image planes, and one or more LSUs for outputting light beams toward corresponding photoconductive members to form latent images on each photoconductive member. Toner may be transferred to a media sheet in a single step process— from the plurality of photoconductive members directly to a media sheet. Alternatively, toner may be transferred from each photoconductive member onto an intermediate transfer member in a first step, and from the intermediate transfer member to a media sheet in a second step. Further, image forming device 100 may be part of a multi-function product having, among other things, an image scanner for scanning printed sheets.

Image forming device 100 further includes a controller 130 and memory 132 communicatively coupled thereto. Though not shown in FIG. 1, controller 130 may be coupled to components and modules in image forming device 100 for controlling same. For instance, controller 130 may be coupled to toner reservoir 109, developer unit 106, photoconductive member 112, fuser assembly 124 and/or LSU 120 as well as to motors (not shown) for imparting motion thereto. It is understood that controller 130 may be implemented as any number of controllers and/or processors for suitably controlling image forming device 100 to perform, among other functions, printing operations.

Figure 3:
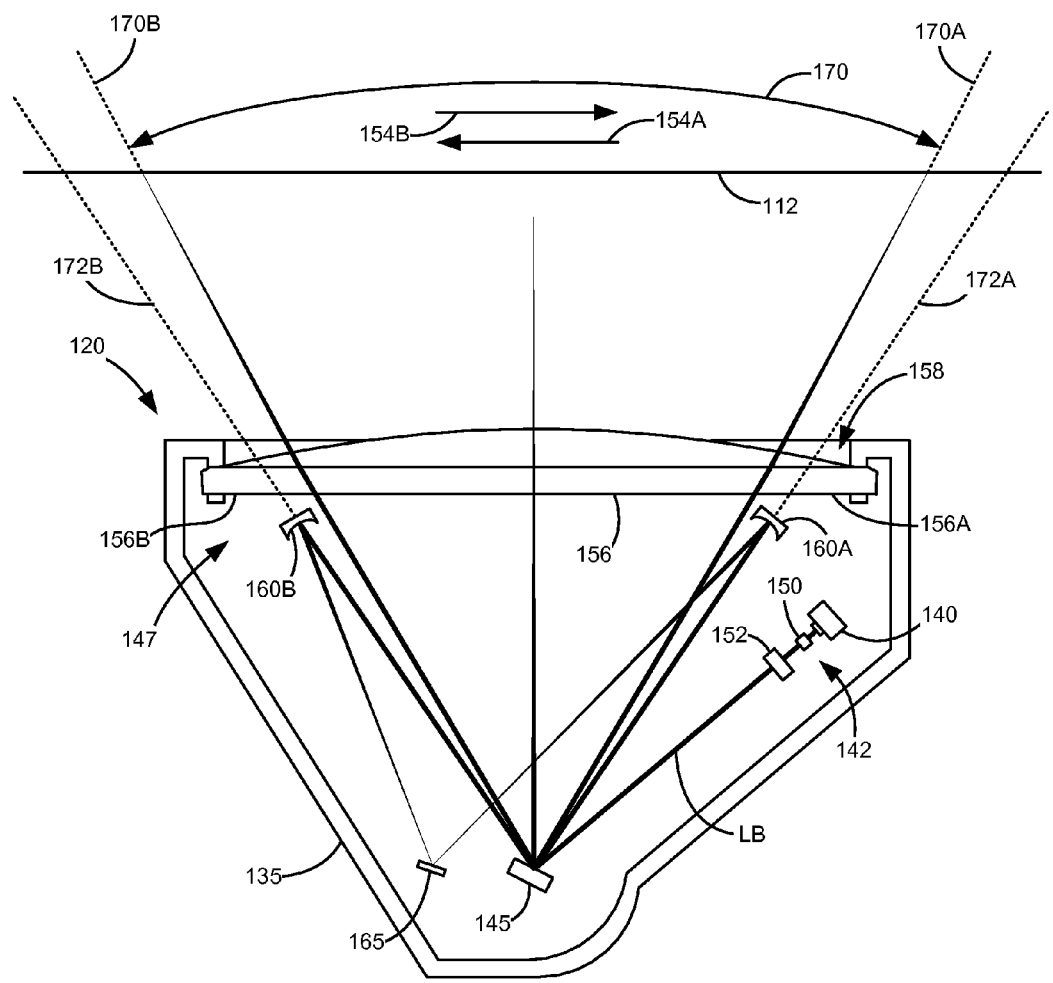
FIG. 3 illustrates a schematic layout of a laser scanning unit of the image forming apparatus in FIG. 2 according to an example embodiment.

Referring now to FIG. 3, a schematic layout of LSU 120 is shown according to an example embodiment of the present disclosure. LSU 120 may include a housing 135 incorporating a light source 140, pre-scan optics 142, a scanning device 145, and post-scan optics 147.

Light source 140 may emit a laser beam LB and may be implemented, for example, using a laser diode or any other suitable device for generating a beam of light. LSU 120 may also include driver circuitry (not shown) communicatively coupled to controller 130 for receiving video/image information and/or control data that may be utilized to set and/or vary the laser power used by light source 140.

Pre-scan optics 142 may include a collimating lens 150 for collimating laser beam LB emitted by light source 140, and/or a pre-scan lens 152 to direct and focus the collimated laser beam LB towards scanning device 145.

Scanning device 145 may include at least one reflective surface for receiving and reflecting light incident thereon. In an example embodiment, scanning device 145 may comprise a bidirectional scanning oscillator, such as a torsion oscillator or resonant galvanometer, controlled to operate bidirectionally at a scanning frequency to scan laser beam LB emitted by light source 140 to create scan lines on the surface of photoconductive member 112 in both forward direction 154A and reverse direction 154B along a main scan direction. In other example embodiments, scanning device 145 may include a polygon mirror having a plurality of facets and controlled to rotate at a rotational velocity during an imaging operation so as to create scan lines on photoconductive member 112 in forward direction 154A. Although scanning device 145 is shown and described herein as a bidirectional scanner, it is only for purposes of description and thus should not be considered limiting.

Post-scan optics 147 may include a post-scan lens 156 used to focus laser beam LB onto the surface of photoconductive member 112. In an example embodiment, housing 135 may include an opening 158 and post-scan lens 156 may be disposed to cover the opening 158 in order to prevent outside contaminants from entering LSU 120. Post-scan optics may also include synchronization optics including horizontal synchronization (hsync) mirrors 160A and 160B. Hsync mirrors 160A and 160B may be positioned proximate to opposite end portions 156A and 156B of post-scan lens 156 and between scanning device 145 and post-scan lens 156 to intercept or pick off laser beam LB for synchronizing scan line operations. Upon intercepting laser beam LB, hsync mirrors 160A and 160B may direct laser beam LB towards a hsync sensor 165 disposed within housing 135. Hsync sensor 165 may be implemented as a photodetector, such as a photodiode, PIN diode, phototransistor, or other devices capable of converting incident light into an electric signal.

During an imaging operation, image data corresponding to an image to be printed may be converted by controller 130 into laser modulation data. The laser modulation data may be utilized by the driver circuitry to modulate light source 140 so that LSU 120 outputs modulated laser beam LB. Laser beam LB emitted from light source 140 may be collimated by collimation lens 150 and pass through pre-scan lens 152 so that laser beam LB converges to strike the reflective surface of scanning device 145. Scanning device 145 may direct portions of laser beam LB modulated with image data toward the surface of photoconductive member 112 through a scan angle 170 defined by scan positions 170A and 170B. Post-scan lens 156 may transform the rotational scan of laser beam LB reflected from scanning device 145 into a substantially linear scan of laser beam LB at the surface of photoconductive member 112, with substantially linear scan velocity, and with substantially uniform laser beam spot size along the surface of photoconductive member 112.

As photoconductive member 112 rotates, a plurality of scan lines may be formed creating a latent image on the surface of photoconductive member 112. In the example embodiment, the plurality of scan lines may comprise alternating forward and reverse scan lines occurring in the forward and reverse directions 154A and 154B, respectively, due to the nature of scanning using bidirectional scanning oscillators.

When laser beam LB is swept by scanning device 145 outside scan angle 170, i.e., beyond scan positions 170A and 170B, such as when laser beam LB reaches scan positions 172A, 172B, laser beam LB may be intercepted by hsync mirrors 160A, 160B and deflected as a synchronization beam towards hsync sensor 165. Output of hsync sensor 165 may be supplied to controller 130 for referencing correct locations of each of the plurality of scan lines. For example, during a forward scan operation for creating a forward scan line, hsync mirror 160A may intercept laser beam LB as laser beam LB is swept at scan position 172A in forward direction 154A to indicate at least a start of the forward scan operation, and/or hsync mirror 160B may intercept laser beam LB as laser beam LB is swept at scan position 172B in forward direction 154A to indicate at least an end of the forward scan operation. Similarly, during a reverse scan operation for creating a reverse scan line, hsync mirror 160B may intercept laser beam LB as laser beam LB is swept in reverse direction 154B at scan position 172B to indicate at least a start of the reverse scan operation, and/or hsync mirror 160A may intercept laser beam LB as laser beam LB is swept in reverse direction 154B at scan position 172B to indicate at least an end of the reverse scan operation. As will be appreciated, the use of hsync mirrors 160B and 160A to detect the ends of forward and reverse scan line operations, respectively, may be optional. Thus, scan position 172A may be used to provide a common reference point for each of the forward scan lines and is characterized by the signal produced by hsync sensor 165 upon receiving synchronization beam deflected by hsync mirror 160A. Conversely, scan position 172B may be used to provide a common reference point for each of the reverse scan lines and is characterized by the signal produced by hsync sensor 165 upon receiving synchronization beam deflected by hsync mirror 160B.

FIGS. 4-6 show an example shape and profile of each of hsync mirrors 160A, 160B in accordance with example embodiments of the present disclosure. FIG. 4 illustrates a perspective view of hsync mirrors 160A, 160B while FIGS. 5 and 6 illustrate top and side views thereof, respectively.

As shown in FIG. 4, hsync mirror 160 may include a generally curved front surface 200 upon which laser beam LB is received and reflected by hsync mirror 160. Front surface 200 may have a generally concave shape and may be toroidal, spherical, aspherical, cylindrical, extended polynomial, or free form, depending on the optical design of LSU 120. Regardless of the shape of the curve, the concave shape of front surface 200 allows hsync mirror 160 to function both as a mirror to reflect laser beam LB incident thereon towards hsync sensor 165, and as an optical lens to focus the reflected laser beam LB onto hsync sensor 165. In one example embodiment, front surface 200 of hsync mirror 160 may have optical power in both the X-direction (corresponding to the main scan direction) and Y-direction (corresponding to a sub-scan or process direction orthogonal to the main scan direction).

In some cases, a laser beam reflected from a scanning device may have different vergences along the X and Y directions. For example, laser beam LB deflected by scanning device 145 may diverge along the Y-direction and slightly converge along the X-direction which may be due to astigmatism in laser beam LB as it departs from the reflective surface of scanning device 145. In order to focus laser beam LB received by hsync mirror 160 onto hsync sensor 165, front surface 200 of hsync mirror 160 may be designed such that each curvature along orthogonal axes X and Y are different from each other. For example, front surface 200 of hsync mirror 160 may have a radius of curvature Ry along the Y-direction that is substantially smaller than a radius of curvature Rx along the X-direction, as shown in FIGS. 4-6, in order to provide more optical power along the Y-direction than the X-direction. In this way, compensation for the differences in vergences may be performed such that light beam LB reflected off of front surface 200 of hsync mirror 160 may be focused on a relatively small laser spot size, such as between about 30 um and about 200 um, and more particularly about 100 um, on hsync sensor 165. In an example embodiment, the radius of curvature Rx may be between about 30 mm and about 500 mm, more particularly between about 80 mm and about 200 mm, such as about 135 mm, and the radius of curvature Ry may be between about 15 mm and about 200 mm, more particularly between about 30 mm and about 100 mm, such as about 52 mm. It is understood, however, that other radius of curvatures may be used, such as selecting Ry to be greater than Rx, or having a substantially equal Rx and Ry, depending on the specific configuration and design requirements of a scanning system.

In one example embodiment, hsync mirror 160 may be made of plastic material, such as polycarbonate or Zeonex resin, and by injection molding. In another example embodiment, hsync mirror 160 may also be made of glass material. The front surface 200 of hsync mirror 160 may be coated with metallic mirror material, such as aluminum, gold, or other metals or mixtures thereof suitable for reflecting light. Hsync mirror 160 may have a height H of about 4 mm, a width W of about 4.5 mm, and a thickness T of about 2 mm. It is contemplated that the size and dimensions of hsync mirror 160 may vary according to specific characteristics and implementations required for a particular optical scanning system design.

Hsync mirrors 160A, 160B may be mounted within housing 135 of LSU 120 using various methods known in the art. In one example, hsync mirror 160 may be adhesively attached to a surface within housing 135 using ultraviolet (UV) adhesive, such as by placing a drop of UV adhesive on the underside 175 or on the backside 177 of hsync mirror 160, adjusting tilt in both X and Y directions until a laser beam is focused at a center of hsync sensor 165, and exposing the UV adhesive with UV light to cure the UV adhesive. In another example, hsync mirror 160 may be placed against a datum of housing 135 and a fastener, such as a clip, may be used to hold hsync mirror 160 in position. As will be appreciated, other known techniques for mounting may be used.

With the above example embodiments, a single curved hsync mirror 160 may replace both glass pickup mirror 40 and synchronization lens 45 in FIG. 1 to act both as a mirror and a lens for reflecting and focusing laser beam LB onto hsync sensor 165. Thus, use of curved hsync mirrors 160 may eliminate the need to incorporate additional optical components, such as lenses, along the optical path of laser beam LB between hsync mirror 160A (or 160B) and hsync sensor 165. Further, employing a curved hsync mirror 160 may allow optical power to be added in both X and Y directions without compromising laser spot velocity. Additionally, because of the relatively small size of the hsync mirrors 160 and simplified optical layout design, synchronization optics may be incorporated within housing 135 of LSU 120 upstream of post-scan lens 156 which reduces the size the LSU housing and cost thereof, and allows a relatively smaller space requirement for the LSU within the imaging forming apparatus, in comparison to the arrangement shown in FIG. 1 having its synchronization optics (including mirrors 40) disposed upstream of scan lens 35, which may generally require a relatively larger LSU housing. Even further, the shorter distance between the hsync mirrors 160 and the scanning device 145 may reduce the sensitivity of laser alignment and, accordingly, improve alignment robustness.

The description of the details of the example embodiments have been described in the context of monochrome electrophotographic imaging devices. However, it will be appreciated that the teachings and concepts provided herein are applicable to color electrophotographic imaging devices and other systems employing optical scanners for scanning light beams.

The foregoing description of several example embodiments of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A scanning system, comprising:
   a scanning member having at least one reflective surface;
   at least one light source for emitting at least one light beam to be incident on the at least one reflective surface of the scanning member during a scanning operation;
   at least one curved synchronization mirror for deflecting and focusing at least a portion of the at least one light beam that is deflected by the scanning member to indicate at least one of a start and an end of a scan line operation of the scanning operation; and
   a sensor for receiving the at least one light beam deflected and focused by the at least one curved synchronization mirror.

2. The scanning system of claim 1, further comprising at least one scan lens for focusing portions of the at least one light beam containing image data onto a surface, wherein the at least one curved synchronization mirror is positioned between the at least one scan lens and the scanning member.

3. The scanning system of claim 2, wherein the at least one curved synchronization mirror is positioned proximate an end portion of the at least one scan lens.

4. The scanning system of claim 2, wherein the at least one curved synchronization mirror includes a first curved synchronization mirror positioned proximate a first end portion of the at least one scan lens, and a second curved synchronization mirror positioned proximate a second end portion of the at least one scan lens, the first and second curved synchronization mirrors for deflecting and focusing a first portion and a second portion of the at least one light beam to indicate the start and the end of the scan line operation, respectively, onto the sensor.

5. The scanning system of claim 2, wherein the surface is a photoconductive surface of a photoconductive member.

6. The scanning system of claim 1, wherein the at least one curved synchronization mirror has a substantially toroidal surface.

7. The scanning system of claim 1, wherein the scanning member and the at least one curved synchronization mirror define therebetween at least a portion of an optical path of the at least one light beam, the portion of the optical path having no optical component therealong.

8. The scanning system of claim 1, wherein the at least one curved synchronization mirror and the sensor define therebetween at least a portion of an optical path of the at least one light beam, the at least a portion of the optical path having no optical component therealong.

9. A scanning system, comprising:
at least one light source for emitting at least one light beam;
a scanning member having at least one reflective surface for repeatedly deflecting the at least one light beam between a first position and a second position during a scanning operation;
at least one scan lens for focusing onto a surface portions of the at least one light beam containing image data and deflected by the scanning member;
a curved synchronization mirror disposed proximate an end portion of the at least one scan lens, the curved synchronization mirror for receiving and deflecting at least a portion of the at least one light beam deflected at the first position so as to indicate a start of a scan line operation of the scanning operation; and
a sensor positioned to receive the at least one light beam deflected by the curved synchronization mirror.

10. The scanning system of claim 9, wherein the curved synchronization mirror is disposed between the at least one scan lens and the scanning member.

11. The scanning system of claim 9, wherein the curved synchronization mirror and the sensor define at least a portion of an optical path for the at least one light beam, the at least one light beam traversing along the at least a portion of the optical path without passing through or being deflected by other optical components.

12. The scanning system of claim 9, wherein the curved synchronization mirror has a substantially toroidal surface from which the at least one light beam is deflected.

13. The scanning system of claim 9, further comprising a second curved synchronization mirror disposed proximate a second end portion of the at least one scan lens, the second curved synchronization mirror for receiving and deflecting at least a second portion of the at least one light beam deflected at the second position to indicate an end of the scan line operation of the scanning operation.

14. The scanning system of claim 13, wherein the second curved synchronization mirror has a substantially toroidal surface for deflecting the at least one light beam.

15. The scanning system of claim 13, wherein the second curved synchronization mirror is disposed between the at least one scan lens and the scanning member.

16. The scanning system of claim 9, wherein the surface is a surface of a photoconductive member.

17. An imaging device, comprising:
at least one photoconductive member for being impinged with at least one light beam; and
a scanning unit for generating the at least one light beam and repeatedly scanning the at least one light beam across the at least one photoconductive member to form scan lines thereon, the scanning unit including;
at least one light source for emitting the at least one light beam;
a scanning member having at least one reflective surface for receiving and deflecting the at least one light beam emitted by the at least one light source;
at least one scan lens for focusing onto the at least one photoconductive member portions of the at least one light beam containing image data and deflected by the scanning member;
a synchronization mirror disposed at a first position proximate an end portion of the at least one scan lens and between the at least one scan lens and the scanning member, the synchronization mirror for receiving and deflecting at least a first portion of the at least one light beam deflected by the scanning member at the first position; and
a sensor positioned to receive the at least one light beam deflected by the synchronization mirror.

18. The imaging device of claim 17, wherein the synchronization mirror is a curved synchronization mirror such that the at least one light beam incident thereon is deflected and focused onto the sensor.

19. The imaging device of claim 18, wherein the curved synchronization mirror and the sensor define therebetween a portion of an optical path of the at least one light beam, the portion of the optical path having no optical component.

20. The imaging device of claim 17, wherein the synchronization mirror has a substantially concave toroidal surface.

21. The imaging device of claim 17, further comprising a second synchronization mirror disposed at a second position proximate a second end portion of the at least one scan lens and between the at least one scan lens and the scanning member, the synchronization mirror deflecting the first portion of the at least one light beam toward the sensor to indicate a start of a scan line operation, and the second synchronization mirror deflecting toward the sensor a second portion of the at least one light beam deflected by the scanning member at the second position to indicate an end of the scan line operation.

22. The imaging device of claim 17, wherein the scanning unit includes a housing having an opening, the scan lens being disposed to cover the opening to prevent contaminants from entering the scanning unit.

* * * * *